United States Patent
Mizuno et al.

(10) Patent No.: US 10,410,761 B2
(45) Date of Patent: Sep. 10, 2019

(54) ELECTRICAL WIRE WITH EXTERIOR MEMBER

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Housei Mizuno, Mie (JP); Hiroki Hirai, Mie (JP); Masaaki Tabata, Mie (JP); Yasuyuki Yamamoto, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/077,907

(22) PCT Filed: Feb. 15, 2017

(86) PCT No.: PCT/JP2017/005439
§ 371 (c)(1),
(2) Date: Aug. 14, 2018

(87) PCT Pub. No.: WO2017/145887
PCT Pub. Date: Aug. 31, 2017

(65) Prior Publication Data
US 2019/0043642 A1 Feb. 7, 2019

(30) Foreign Application Priority Data
Feb. 24, 2016 (JP) .................. 2016-032892

(51) Int. Cl.
*H01B 7/00* (2006.01)
*H01B 7/18* (2006.01)
(Continued)

(52) U.S. Cl.
CPC ............... *H01B 7/18* (2013.01); *B32B 5/022* (2013.01); *B32B 5/06* (2013.01); *B60R 16/0215* (2013.01);
(Continued)

(58) Field of Classification Search
CPC ... H01B 7/02; H01B 7/04; H01B 7/18; H02G 3/0462
(Continued)

(56) References Cited

U.S. PATENT DOCUMENTS 7,094,970 B2 * 8/2006 Kihira .................. H01R 9/032
174/74 R
8,420,936 B2 * 4/2013 Huang ................. H02G 3/0481
174/117 F
(Continued)

FOREIGN PATENT DOCUMENTS

JP 3127635 * 11/2006 ............... H01B 7/18
JP WO2015-030011 A * 3/2015 ............... H01B 7/18
(Continued)

OTHER PUBLICATIONS

Official Communication issued in International Bureau of WIPO Patent Application No. PCT/JP2017/005439, dated Apr. 4, 2017.

*Primary Examiner* — William H. Mayo, III
(74) *Attorney, Agent, or Firm* — Greenblum & Bernstein, P.L.C.

(57) ABSTRACT

A technology that, even in the case where a sheet member employed as an exterior member has low flexibility, is able to make a portion where the sheet member is wrapped around an electrical wire easily bendable. The electrical wire
(Continued)

includes a bending part arranged in a bent state. The exterior member includes a sheet main body part wrapped around a portion of the electrical wire that includes the bending part. A slit is formed in a portion of the main body part that is wrapped around the bending part, in a direction including a direction in which a wrapping start portion and a wrapping end portion of the main body part are joined together.

5 Claims, 5 Drawing Sheets

(51) Int. Cl.
    *B32B 5/02*     (2006.01)
    *B32B 5/06*     (2006.01)
    *G10K 11/168*     (2006.01)
    *H01B 7/04*     (2006.01)
    *H02G 3/04*     (2006.01)
    *B60R 16/02*     (2006.01)

(52) U.S. Cl.
    CPC ............. *G10K 11/168* (2013.01); *H01B 7/04* (2013.01); *H02G 3/0462* (2013.01)

(58) Field of Classification Search
    USPC ................................ 174/36, 110 R, 112, 115
    See application file for complete search history.

(56) References Cited

U.S. PATENT DOCUMENTS

| | | | |
|---|---|---|---|
| 9,978,352 | B2 | 5/2018 | Takata |
| 2011/0064369 | A1* | 3/2011 | Furuyama ............ H05K 1/0274 385/129 |
| 2014/0131062 | A1* | 5/2014 | Masuda .............. B60R 16/0215 174/68.3 |
| 2014/0131095 | A1* | 5/2014 | Toyama .............. B60R 16/0215 174/72 A |
| 2014/0246230 | A1 | 9/2014 | Takahashi |
| 2015/0179300 | A1* | 6/2015 | Inao .................... B60R 16/0215 174/68.3 |
| 2016/0009234 | A1* | 1/2016 | Adachi ................ H02G 3/0468 174/72 A |
| 2016/0101746 | A1* | 4/2016 | Inao .................... B60R 16/0215 174/72 A |
| 2016/0101747 | A1* | 4/2016 | Inao .................... B60R 16/0215 174/72 A |
| 2016/0129861 | A1* | 5/2016 | Oga .................... B60R 16/0215 174/72 A |
| 2016/0137146 | A1* | 5/2016 | Yanagihara ............. H02G 3/22 174/72 A |
| 2016/0164269 | A1* | 6/2016 | Inao .................... B60R 16/0207 174/68.3 |
| 2016/0167601 | A1* | 6/2016 | Yoshida .............. B60R 16/0215 174/72 A |
| 2016/0329039 | A1 | 11/2016 | Takata |

FOREIGN PATENT DOCUMENTS

| | | |
|---|---|---|
| JP | 2015-139948 | 8/2015 |
| WO | 2013/038760 | 3/2013 |

\* cited by examiner

ELECTRICAL WIRE WITH EXTERIOR MEMBER

TECHNICAL FIELD

This invention relates to a technology for making an electrical wire with exterior member easily bendable.

BACKGROUND ART

Various exterior members are attached to electrical wires arranged in a vehicle, for purposes such as protection, routing regulations and soundproofing.

For example, Patent Document 1 discloses a wire harness with sound insulation material in which the electrical wire is sandwiched by two sheets of nonwoven fabric for the purpose of sound insulation.

CITATION LIST

Patent Documents

Patent Document 1: JP 2015-139948A

SUMMARY OF INVENTION

Technical Problem

Incidentally, there are electrical wires with exterior members in which the exterior member is formed by a sheet-like member being wrapped around the electrical wire. However, in the case where a sheet-like member that is wrappable but has low flexibility is employed, it is difficult to bend the portion where the sheet-like member is wrapped around the electrical wire.

In view of this, an object of the present invention is to provide a technology that, even in the case where a sheet-like member employed as an exterior member has low flexibility, is able to make a portion where the sheet-like member is wrapped around an electrical wire easily bendable.

Solution to Problem

In order to solve the above problem, an electrical wire with exterior member according to a first aspect is provided with an electrical wire including a bending part arranged in a bent state and a straight part arranged linearly and contiguous with the bending part, and an exterior member including a sheet-like main body part having a bending part wrapping part wrapped around the bending part of the electrical wire and a straight part wrapping part wrapped around the straight part of the electrical wire, with a slit being formed in only the bending part wrapping part out of the bending part wrapping part and the straight part wrapping part, in a direction including a direction in which a wrapping start portion and a wrapping end portion of the main body part are joined together.

An electrical wire with exterior member according to a second aspect is the electrical wire with exterior member according to the first aspect in which the slit is formed in an intermediate portion between the wrapping start portion and the wrapping end portion.

An electrical wire with exterior member according to a third aspect is the electrical wire with exterior member according to the second aspect in which the slit is formed at least once around the electrical wire.

An electrical wire with exterior member according to a fourth aspect is the electrical wire with exterior member according to the third aspect in which the main body part is wrapped at least twice around the electrical wire, and the slit is formed toward the wrapping end portion from a position spaced by at least one wrap around of the main body part toward the wrapping end portion from the wrapping start portion, so as to be at least partially exposed externally.

An electrical wire with exterior member according to a fifth aspect is the electrical wire with exterior member according to any one of the first to fourth aspects in which the exterior member is formed in a state where a plurality of sheet-like member are stacked, and the slit is formed in corresponding positions of the respective sheet-like members.

An electrical wire with exterior member according to a sixth aspect is the electrical wire with exterior member according to any one of the first to fifth aspects in which the exterior member is formed with a nonwoven fabric as a material.

Advantageous Effects of Invention

According to the first to sixth aspects, the difference between the inner peripheral side portion and the outer peripheral side portion of the portion of the main body part that is wrapped around the bending part can be absorbed due to the slit being formed. Even in the case where a sheet-like member employed as an exterior member has low flexibility, a portion where the sheet-like member is wrapped around the electrical wire can thereby be made easily bendable.

In particular, according to the second aspect, the main body part does not easily curl up, compared with the case where slits are formed in the end parts of the main body part including the wrapping start portion and the wrapping end portion.

In particular, according to the third aspect, the slit is formed at least once around the electrical wire, and thus flexibility can be added in whichever direction the electrical wire bends.

In particular, according to the fourth aspect, the slit is not formed in portions of the main body part that could possibly contact the electrical wire, and this configuration is thus suitable for purposes such as protection of the electrical wire. The slit is formed on the outer peripheral side around the electrical wire, and is thus better able to absorb the difference between the inner peripheral side portion and the outer peripheral side portion of the portion of the main body part that is wrapped around the bending part.

In particular, according to the fifth aspect, the portion where the sheet-like member is wrapped around the electrical wire can be made easily bendable, even in the case where a plurality of sheet-like members stacked.

In particular, according to the sixth aspect, the exterior member is formed with a nonwoven fabric as the material. There are nonwoven fabrics that tend not to be stretchable. However, even with nonwoven fabrics that tend not to be stretchable, the portion where the sheet-like member is wrapped around the electrical wire can be made easily bendable by forming a slit.

DESCRIPTION OF EMBODIMENTS

Embodiments

Figure 1:
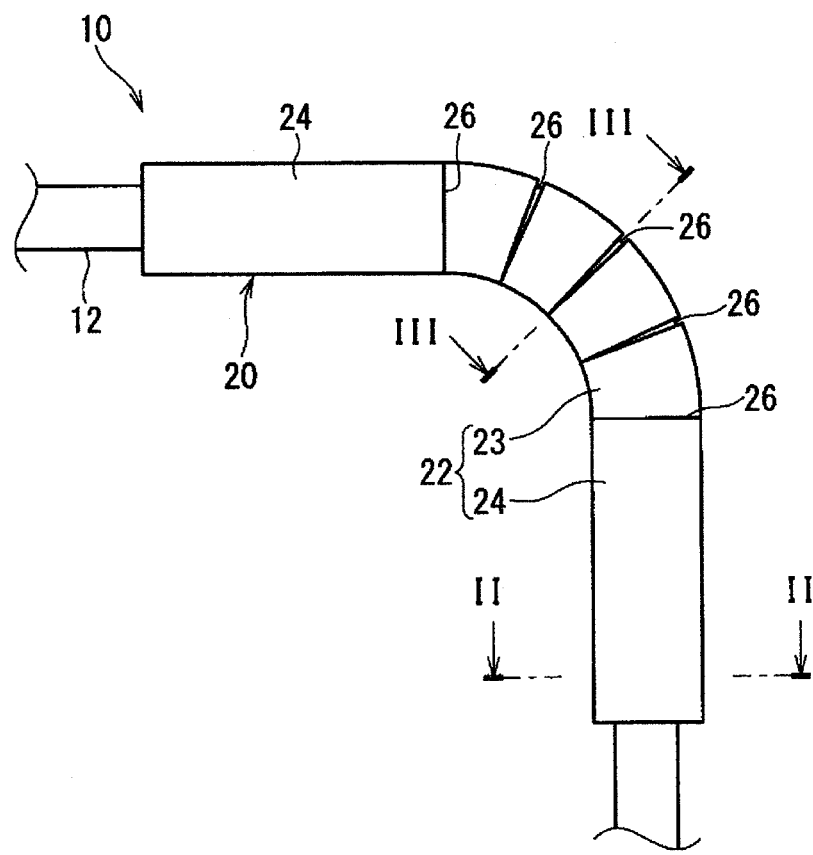
FIG. 1 is a plan view showing an electrical wire with exterior member according to an embodiment.
Figure 2:
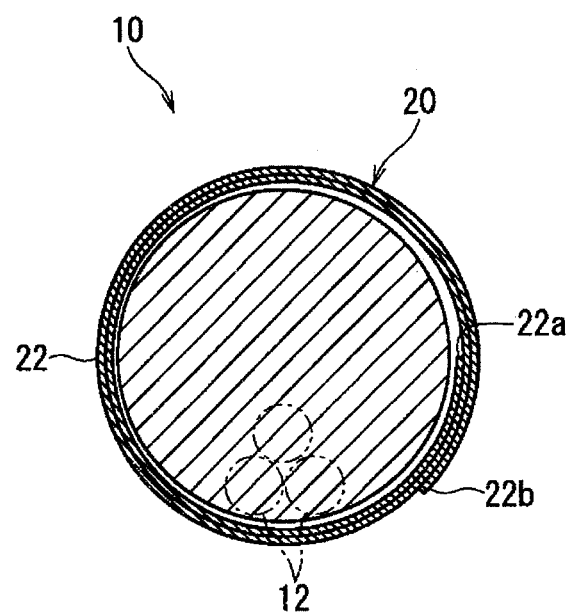
FIG. 2 is a cross-sectional view taken along II-II in FIG. 1.
Figure 3:
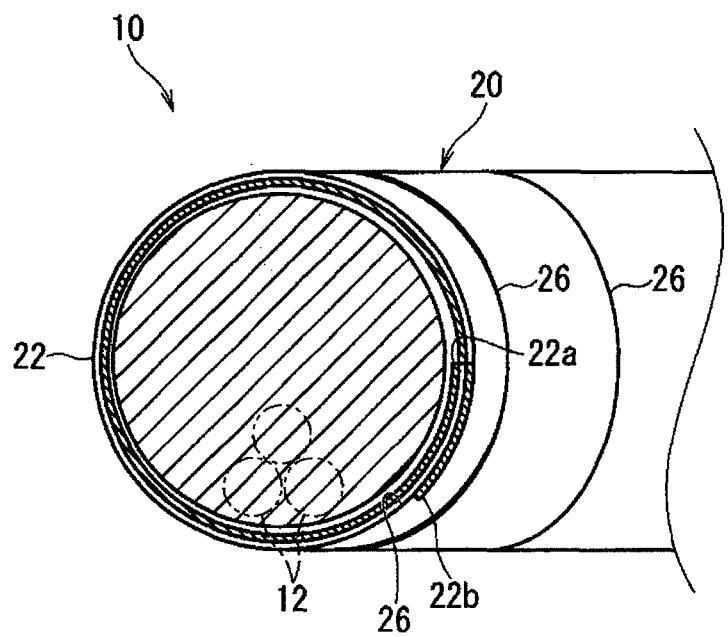
FIG. 3 is a cross-sectional view taken along in FIG. 1.
Figure 4:
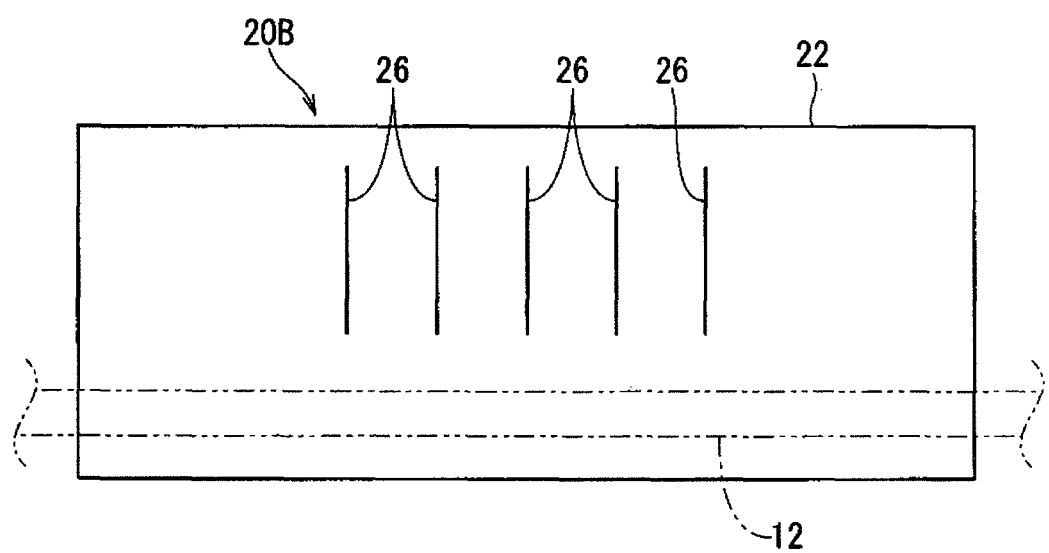
FIG. 4 is an expanded view showing an exterior member according to an embodiment.

Hereinafter, an electrical wire with exterior member and an exterior member according to an embodiment will be described. FIG. 1 is a plan view showing an electrical wire 10 with exterior member according to the embodiment. FIG. 2 is a cross-sectional view taken along II-II in FIG. 1. FIG. 3 is a cross-sectional view taken along in FIG. 1. FIG. 4 is an expanded view showing an exterior member 20 according to the embodiment.

The electrical wire 10 with exterior member is provided with an electrical wire 12 and the exterior member 20.

At least one electrical wire 12 need only be included. This embodiment describes the case where the electrical wire 10 with exterior member is provided with a bundle of electrical wires 12 which includes a plurality of electrical wires 12. Each electrical wire 12 is provided with a core and cladding formed around the core, for example. The core is linearly formed using a conductive material such as copper, a copper alloy, aluminum or an aluminum alloy. Here, the core is constituted by a plurality of wire stands being twisted together. Naturally, the core may be constituted by a single wire. The cladding is formed by an insulating resin material being extruded around the core by an extrusion device or the like. End parts of the electrical wire 12 are connected to connectors and the like. The electrical wire 12 is connected to various electrical devices mounted in a vehicle or the like via connectors and the like, in a state of being arranged in a suitable location of the vehicle or the like. The electrical wire 12 is used to electrically connect various electrical devices to each other.

The electrical wire 12 includes a bending part that is arranged in a bent state. The exterior member 20 is attached to a region of the electrical wire 12 that includes the bending part. Note that it is envisioned that the electrical wire 12 will be bent after the exterior member 20 has been wrapped therearound.

Figure 5:
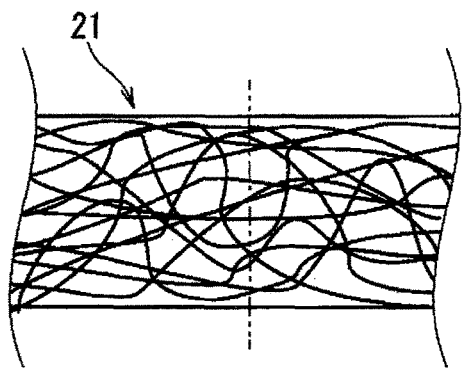
FIG. 5 is a schematic diagram showing the spunbonded nonwoven fabric that is used as a material of the exterior member.

The exterior member 20 is formed with a sheet-like member as the material. Here, it is envisioned that the sheet-like member is a member that can be wrapped around the electrical wire 12, and is not easily bendable in the wrapped state. As such a sheet-like member, a spunbonded nonwoven fabric 21, for example, is conceivable. FIG. 5 is a schematic diagram showing the spunbonded nonwoven fabric 21 that is used as a material of the exterior member 20.

The spunbonded nonwoven fabric 21 takes a shape obtained by gathering long fibers that mainly extend continuously in one direction while bending in places, as shown in FIG. 5. The reason the spunbonded nonwoven fabric 21 takes such as a shape is due to the spunbonded nonwoven fabric 21 being a nonwoven fabric formed by a spunbonding method. The process of manufacturing a nonwoven fabric is broadly divided into two processes. One is a web formation process of forming a structure (called a web) in which fibers are stacked. The other is a web bonding process of bonding the fibers of the formed web. The spunbonding method is one method that can be employed in the web formation process. In the spunbonding method, a thermoplastic polymer (e.g., polypropylene, etc.) serving as a raw material is melted and discharged to form continuous long fibers. After having layered the discharged long fibers on a conveyor belt in a randomly snaking manner to form a web, the web is sequentially sent to the bonding process. The long fibers are still continuous at this stage. Since the spunbonded nonwoven fabric is thus formed by long fibers that are discharged being mainly conveyed in one direction (conveyance direction of conveyor belt), the fabric takes the directionally biased shape described above.

Note that, here, the web bonding process will be described as a process in which a thermal bonding method is employed. The thermal bonding method is a method of bonding a web by thermally welding some or all of the fibers in the web. Here, thermal welding of some of the fibers is carried out by thermally embossing the surface of the spunbonded nonwoven fabric 21. Naturally, other methods may be employed in the web bonding process, such as a chemical bonding method, a needle punching method and a hydroentanglement method, and a plurality of methods may be combined.

Since the fibers constituting the spunbonded nonwoven fabric 21 take a continuous long fiber-like shape as mentioned above, the spunbonded nonwoven fabric 21 is suitable as a high-strength protective material. However, on the other hand, since there are a large number of bonding points (entanglement points) due to the fibers having a continuous long fiber-like shape, the spunbonded nonwoven fabric 21 normally tends not to be stretchable. The spunbonded nonwoven fabric 21 is thus difficult to bend when in a state of being wrapped around the electrical wire 12, and there is a risk of the fabric becoming folded if forcefully bent. There was thereby a risk of the places where the spunbonded nonwoven fabric 21 could be attached to the electrical wire 12 being limited. An object of the electrical wire 10 with exterior member according to the present invention is to make a sheet-like member that is thus difficult to bend in a state of being wrapped around the electrical wire 12 easily bendable.

The exterior member 20 is formed by the spunbonded nonwoven fabric 21 being wrapped around the electrical wire 12. Hereinafter, in the case where it is necessary to distinguish the exterior member 20 before wrapping, a letter will be attached such as "exterior member 20B". The exterior member 20 includes a main body part 22. A slit 26 is formed in the main body part 22.

The main body part 22 is formed to be sheet-like. The main body part 22 is wrapped around a portion of the electrical wire 12 that includes the bending part. Specifically, the main body part 22 includes a bending part wrapping part 23 and a straight part wrapping part 24. The bending part wrapping part 23 is a portion that is wrapped around the bending part of the electrical wire 12. The straight part wrapping part 24 is a portion that is contiguous on either side of the bending part wrapping part 23. The straight part wrapping part 24 is a portion that is wrapped around straight parts of the electrical wire 12 that are contiguous with the bending part. The main body part 22 is wrapped at least twice around the electrical wire 12. The main body part 22 is, for example, wrapped around more than two times and less than or equal to two and a half times. In this case, the portion that is wrapped around more than two times can conceivably be used, for example, as an attachment margin for fastening the exterior member. In the example shown in FIG. 2, the main body part is wrapped two and one-eighth times around, one-eighth of which is used as an attachment margin.

The slit 26 is formed in the bending part wrapping part 23 of the main body part 22. Note that the slit 26 may be or may not be provided in the straight part wrapping part 24 of the main body part 22. For example, in the case of handing multiple types of attachment objects with one type of exterior member, the slit 26 can also be formed in the straight part wrapping part 24 of the main body part 22. The slit 26 is formed in a direction including the direction in which a wrapping start portion 22a and a wrapping end portion 22b of the main body part 22 are joined together. Here, the slit 26 is formed in a direction that coincides with the direction in which the wrapping start portion 22a and the wrapping end portion 22b are joined together. In other words, in the state prior to wrapping shown in FIG. 4, the extending direction of the slit 26 is orthogonal to the extending direction of the electrical wire 12.

The slit 26 is formed in an intermediate portion between the wrapping start portion 22a and the wrapping end portion 22b. The slit 26 is formed at least once around the electrical wire 12. The slit 26 is formed toward the wrapping end portion 22b from a position spaced by at least one wrap around of the main body part 22 toward the wrapping end portion 22b from the wrapping start portion 22a, so as to be at least partially exposed externally. Here, the slit 26 is formed once around, toward the wrapping end portion 22b from a position spaced by one wrap around of the main body part 22 toward the wrapping end portion 22b from the wrapping start portion 22a. More specifically, the main body part 22 is wrapped two and one-eighth times around, and thus, in the example shown in FIG. 3, the slit 26 is not formed in the one wrap around portion that includes the wrapping start portion 22a of the main body part 22 or in the one-eighth wrap around portion that includes the wrapping end portion 22b. Also, a seven-eighth wrap around portion of the slit 26 is outwardly exposed.

The slit 26 is inserted in a direction shown by the imaginary line (two-dot chain line) in FIG. 5. In other words, the slit is formed in a direction intersecting the direction in which the long fibers are mainly continuous. The long fibers are thereby severed by the slit 26. The number of slits 26 that are formed in the main body part 22 may be one or may be plural. In the example shown in FIG. 4, five slits 26 are formed in parallel. The exterior member 20 becomes more easily bendable as the number of the slit 26 in the portion of the main body part 22 that is wrapped around the bending part increases. In the case where a plurality of slits are formed in the main body part 22, the plurality of slits may be formed in the same shape or may be formed in different shapes. Also, in the case where a plurality of slits 26 are formed in the main body part, the interval between adjacent slits need only be appropriately set. The exterior member 20 becomes more easily bendable as the interval between adjacent slits decreases.

The slit 26 is formed by inserting a cut in the main body part 22, and has no width in the state of the exterior member 20B. In other words, the slit 26 is formed without cutting away the main body part 22.

Naturally, the shape of the slit 26 is not restricted to those described above. Variations of the slit will be discussed in detail later.

The vicinity of the portion of the main body part 22 in which the slit 26 is formed can also be viewed as an added-flexibility part.

Manufacturing Method and Operation

Here, a manufacturing method of the electrical wire 10 with exterior member and operation of the exterior member 20 when bent will be described.

First, as shown in FIG. 4, the electrical wire 12, including the portion that will later be formed into the bending part, is arranged linearly, and the exterior member 20B is wrapped around this electrical wire 12. The exterior member 20B is wrapped in a state of being oriented with the extending direction of the slits 26 orthogonal to the extending direction of the electrical wire 12. At this time, the exterior member 20B is wrapped with the side having the large region without any slits 26 formed therein as the wrapping start portion 22a, such that the slits 26 are will be located on the outer peripheral side around the electrical wire 12. When the exterior member 20B has been wrapped around the electrical wire 12 to form a tubular shape, the exterior member 20 may be fastened in order to maintain the tubular shape. For example, the exterior member 20 is fastened by means such as an adhesive tape being wrapped around the periphery of the electrical wire 12 and both end portions of the exterior member 20 in the extending direction of the electrical wire 12.

When the exterior member 20 has been attached to the electrical wire 12, the electrical wire 12 is bent to form the bending part. In manufacturing a wire harness, for example, it is conceivable that the electrical wire 12 will be bent on a drawing board for combining the electrical wire 10 with exterior member with other electrical wires or at the time of assembly in the vehicle. When the electrical wire 12 is bent, the bending part wrapping part 23 of the exterior member 20 will also bend in response thereto. At this time, the portion in which the slits 26 are formed in the bending part wrapping part 23 is, due to the slits 26 deforming, able to absorb the difference (hereinafter, "inside-outside difference") between the inner peripheral side portion and the outer peripheral side portion relative to the center of curvature when bent, and bends easily.

More specifically, the portion of the slits 26 that is located on the outer peripheral side relative to the center of curvature deforms so as to open. The exterior member is thereby able to cope with the path on the outer peripheral side becoming longer when bent. Also, the portion of the slits 26 that is located on the inner peripheral side relative to the center of curvature deforms so as to close (so that both edges that sandwich the slit 26 partially overlap). The exterior member is thereby able to cope with the path on the inner peripheral side becoming shorter when bent. In the bending part wrapping part 23, the opening of the slits 26 gradually becomes wider, moving toward the outer peripheral side relative to the center of curvature.

In contrast, regions of the bending part wrapping part 23 in which the slits 26 are not formed and that are thus contiguous in the extending direction of the electrical wire 12 do not readily absorb the inside-outside difference and thus do not easily bend. The inside-outside difference is not readily absorbed, particularly in the case where the exterior member is formed with a material that tends not to be stretchable such as the spunbonded nonwoven fabric 21.

In other words, by forming the slits 26 in the exterior member 20, regions that are contiguous in the extending direction of the electrical wire 12, that is, regions that do not readily absorb the inside-outside difference, change to regions that are divided in the extending direction of the electrical wire 12, that is, regions that readily absorb the inside-outside difference. As a result, the exterior member 20 becomes easily bendable in a state of being wrapped around the electrical wire 12.

Also, here, the slits 26 are formed on the outer peripheral side around the electrical wire 12, thus enabling the inside-outside difference that occurs in the bending part wrapping part 23 of the main body part 22 to be absorbed more fully.

Also, since the slits 26 are formed once around the bending part wrapping part 23, the exterior member becomes easily bendable in any direction. Also, attachment is facilitated, since the need to consider the orientation of the exterior member around the electrical wire 12 so that the slits 26 are in desired positions (e.g., positions where the slits 26 are located on the outer peripheral side relative to the center of curvature) is reduced at the time of attachment.

According to such an electrical wire 10 with exterior member and such an exterior member 20, the difference between the inner peripheral side portion and the outer peripheral side portion of the main body part 22 relative to the center of curvature can be absorbed due to the slits 26 being formed. Even in the case where a sheet-like member having low flexibility is employed as the exterior member 20, the portion where the sheet-like member is wrapped around the electrical wire 12 can thereby be made easily bendable.

Also, since the slits 26 are formed in an intermediate portion of the main body part 22 between the wrapping start portion 22a and the wrapping end portion 22b, the main body part 22 tends not to curl up, compared with the case where the slits 26 are formed in end parts of the main body part 22 including the wrapping start portion 22a or the wrapping end portion 22b. Furthermore, when wrapping the exterior member 20 around the electrical wire 12, the wrapping start portion 22a and the wrapping end portion 22b are easy to wrap, due to the slits 26 not being formed in the end part that includes the wrapping start portion 22a and the end part that includes the wrapping end portion 22b.

Also, since the slits 26 are formed at least once around the electrical wire 12, flexibility can be added in every direction that the electrical wire 12 bends.

Also, since the slits 26 are not formed in the one wrap around on the inner peripheral side of the main body part 22 that could possibly contact the electrical wire 12, the exterior member is suitable for purposes such as protection of the electrical wire 12. The slits 26 are formed on the outer peripheral side, and are thus better able to absorb the difference between the inner peripheral side portion and the outer peripheral side portion of the portion of the main body part 22 that is wrapped around the bending part.

Also, the exterior member 20 is formed with the spunbonded nonwoven fabric 21 as the material. The spunbonded nonwoven fabric 21 is formed by discharging long fibers, and thus, normally, tends not to be stretchable. The spunbonded nonwoven fabric 21 is thus difficult to bend when formed in a tubular shape. However, even in the case where the exterior member 20 is formed with the spunbonded nonwoven fabric 21 as the material, the portion where the sheet-like member is wrapped around the electrical wire 12 can be made easily bendable, due to being able to sever the long fibers by forming the slits 26.

Figure 6:
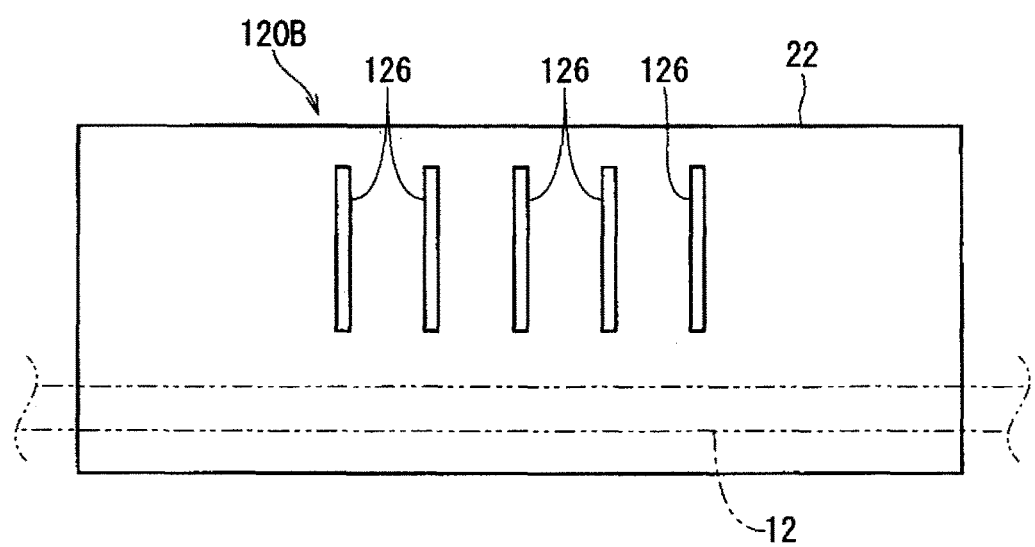
FIG. 6 is an expanded view showing an exterior member according to a first variation.
Figure 7:
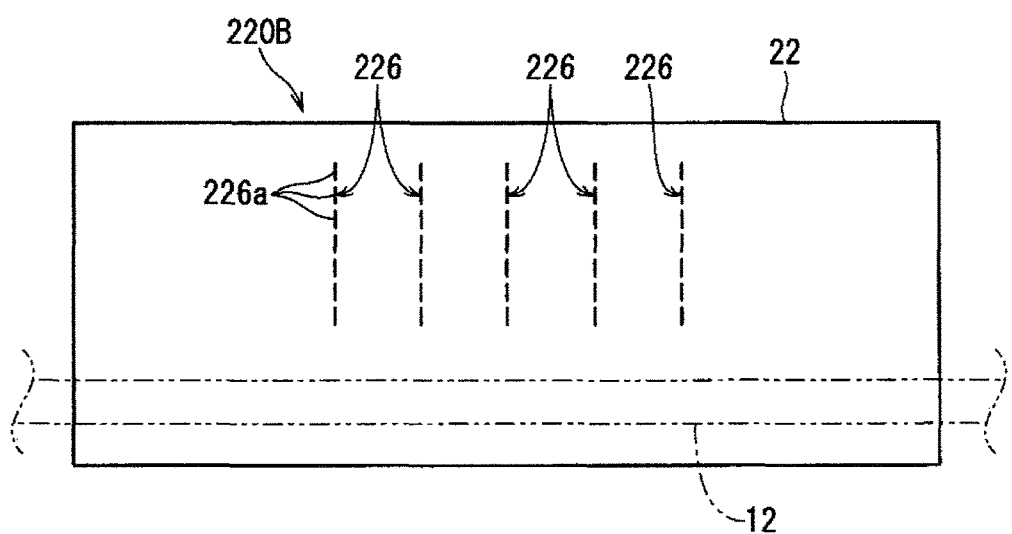
FIG. 7 is an expanded view showing an exterior member according to a second variation.
Figure 8:
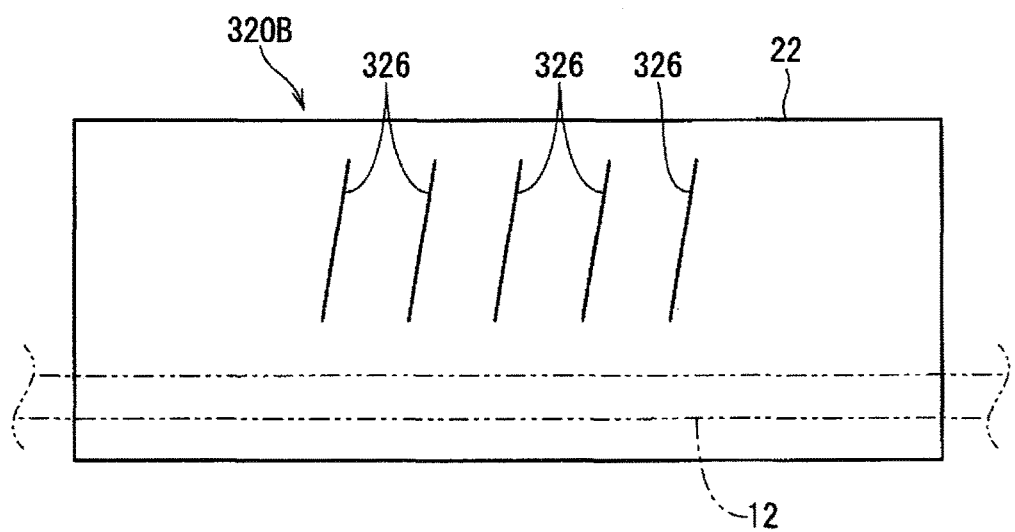
FIG. 8 is an expanded view showing an exterior member according to a third variation.
Figure 9:
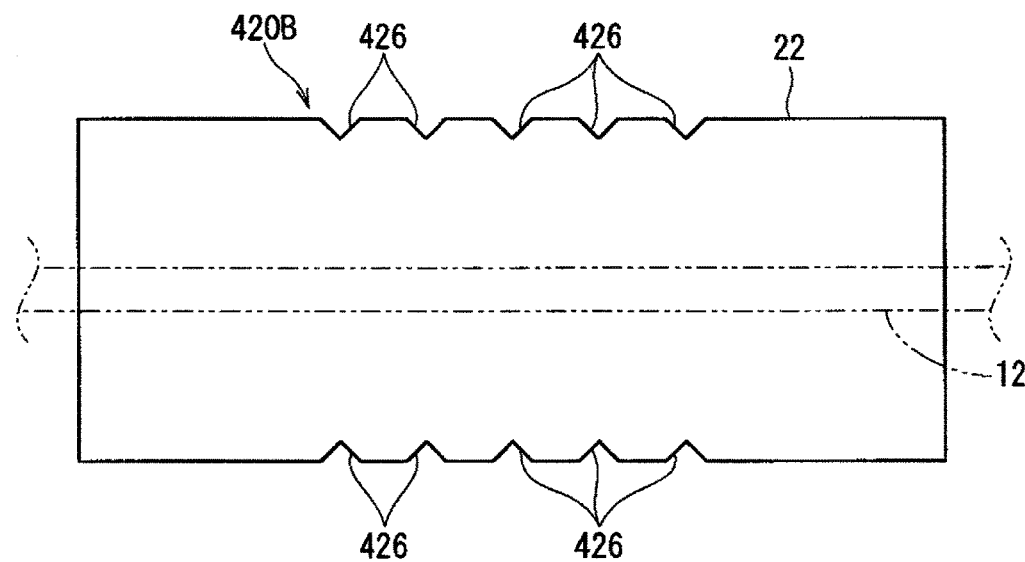
FIG. 9 is an expanded view showing an exterior member according to a fourth variation.
Figure 10:
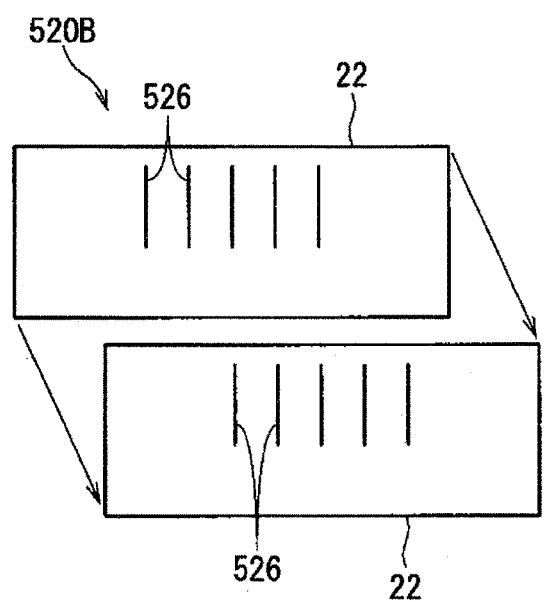
FIG. 10 is a diagram showing an exterior member according to a fifth variation.

Next, variations of the exterior member 20 will be described, with reference to FIGS. 6 to 10. FIG. 6 is an expanded view showing an exterior member according to a first variation. FIG. 7 is an expanded view showing an exterior member according to a second variation. FIG. 8 is an expanded view showing an exterior member according to a third variation. FIG. 9 is an expanded view showing an exterior member according to a fourth variation. FIG. 10 is a diagram showing an exterior member according to a fifth variation.

First Variation

Although, in the embodiment, the slits 26 are described as not having width, this configuration is not essential. As with an exterior member 120B shown in FIG. 6, slits 126 may have width. The amount that the slits 126 open thereby increases, and the exterior member becomes easily bendable. Also, since part of the main body part 22 is cut away in this case, weight saving can be achieved.

Second Variation

Although, in the embodiment, the slits 26 are described as being continuous in the extending direction, this configuration is not essential. As with an exterior member 220B shown in FIG. 7, slits 226 may be formed so that a plurality of small slits 226a such as so-called perforations are discontinuously aligned in the extending direction. In this case, when bending the tubular exterior member, the exterior member easily bends, due to each slit 226a deforming to open or close.

Third Variation

Although, in the embodiment, the extending direction of the slits 26 is described as coincided with the direction in which the wrapping start portion 22a and the wrapping end portion 22b of the main body part 2 are joined together, that is, as being orthogonal to the extending direction of the electrical wire 12, this configuration is not essential. As with an exterior member 320B shown in FIG. 8, slits 326 may intersect a direction that is not orthogonal to the extending direction of the electrical wire 12. In this case, the slits 326 may be formed in a zigzag shape such as a V-shape or a Z-shape due to combining a plurality of small slits that extend in different directions.

Fourth Variation

Although, in the embodiment, the slits 26 are described as being formed in an intermediate portion of the bending part wrapping part 23 between the wrapping start portion 22a and the wrapping end portion 22b, this configuration is not essential. As with an exterior member 420B shown in FIG. 9, slits 426 may be formed in the end edge part of at least one of the wrapping start portion 22a and the wrapping end portion 22b. In the example shown in FIG. 9, the slits 426 are formed in the end edge part of both the wrapping start portion 22a and the wrapping end portion 22b. Although the slits 426 are formed by cutting away the main body part 22 in a V shape, the shape of the slits 426 is not limited thereto. For example, the slits 426 can be formed by simply inserting cuts without cutting away the main body part, as with the slits 26.

Fifth Variation

Although, in the embodiment, the exterior member 20 is described as being formed with a single sheet-like member as the material, this configuration is not essential. As with an exterior member 520B shown in FIG. 10, the exterior member 520B may be formed in a state where a plurality of sheet-like members are stacked. In this case, it is conceivable that slits 526 are formed in corresponding positions of the respective sheet-like members. At this time, the plurality of sheet-like members in which the slits 526 have been formed in advance may be stacked. Also, a plurality of sheet-like members may be stacked in a state where the slits 526 are not formed therein, and the slits 526 may then be collectively formed in the stacked sheet-like members. In this case, the plurality of sheet-like members that are stacked up may be members of the same type or may members of different types. In the case where the plurality of sheet-like members that are stacked up are members of different types, a combination of a film-like member and a nonwoven fabric is conceivable, for example.

According to such an exterior member 520B, the portion where the sheet-like member is wrapped around the electrical wire 12 can be made easily bendable, even in the case where a plurality of sheet-like members are stacked.

Other Variations

Although, in the embodiment, the sheet-like member constituting the exterior member 20 is described as being the spunbonded nonwoven fabric 21, among the various types of nonwoven fabrics, this configuration is not essential. The sheet-like member may, for example, be a nonwoven fabric other than the spunbonded nonwoven fabric 21, such as a needle-punched nonwoven fabric, or may be a member other than a nonwoven fabric, such as a woven fabric or a knit. Also, the sheet-like member may be a composite of those materials.

Although, in the embodiment, the exterior member 20 is described as including the two straight part wrapping parts 24 that are contiguous on both sides of the bending part wrapping part 23, this configuration is not essential. At least one of the straight part wrapping parts 24 may be omitted.

Although, in the embodiment, the exterior member 20 is described as being wrapped at least twice around the electrical wire 12, this configuration is not essential. Also, although, in the embodiment, the slits 26 are described as being formed at least once around the electrical wire, this configuration is not essential. The wrapped amount of the exterior member around the electrical wire 12 and the formed amount of the slits need only be appropriately set. For example, the exterior member may be wrapped less than twice around the electrical wire 12. In this case, the exterior member is preferably wrapped at least once around the electrical wire 12. Also, for example, the slit may be formed less than once around the electrical wire. In this case, the slits are preferably formed at least half way around the electrical wire 12, and the slits are preferably located on the outer peripheral side relative to the center of curvature of the bending part.

Note that the configurations described in the above embodiment and variations can be appropriately combined, as long as there are no mutual inconsistencies.

Although the invention has been described in detail above, the above descriptions are in all respects illustrative, and the invention is not limited to those descriptions. It should be understood that innumerable variations that are not described herein can be envisaged without departing from the scope of the invention.

LIST OF REFERENCE NUMERALS

10 Electrical wire with exterior member
12 Electrical wire
20 Exterior member
21 Spunbonded nonwoven fabric
22 Main body part
22a Wrapping start portion
22b Wrapping end portion
23 Bending part wrapping part
24 Straight part wrapping part
26 Slit

The invention claimed is:

1. An electrical wire with exterior member, comprising:
an electrical wire including a bending portion arranged in a bent condition and a straight portion arranged linearly and contiguous with the bending portion; and
an exterior member including a sheet main body having a bending portion wrapping portion wrapped around the bending portion of the electrical wire and a straight portion wrapping portion wrapped around the straight portion of the electrical wire, with a slit formed in the bending portion wrapping portion and not in the straight portion wrapping portion, the slit being formed in a direction including a direction in which a wrapping start portion and a wrapping end portion of the main body are joined together,
wherein the main body is wrapped at least twice around the electrical wire, and
the slit is provided toward the wrapping end portion extending from a position spaced by at least one wrap around of the main body toward the wrapping end portion from the wrapping start portion, so as to be exposed externally of the exterior member.

2. The electrical wire with exterior member according to claim 1,
wherein the slit is formed in an intermediate portion between the wrapping start portion and the wrapping end portion of the main body.

3. The electrical wire with exterior member according to claim 2,
wherein the slit extends at least once around the electrical wire.

4. The electrical wire with exterior member according to claim 1,
wherein the exterior member is formed in a condition in which a plurality of sheet members are stacked, and the slit is formed in corresponding positions of the respective sheet members.

5. The electrical wire with exterior member according to claim 1,
wherein the exterior member is formed with a nonwoven fabric as a material.

* * * * *